(12) United States Patent
Davidson (10) Patent No.: US 9,078,249 B2
(45) Date of Patent: Jul. 7, 2015

(54) CARRIER LINK, CONVEYOR CHAIN COMPRISING A PLURALITY OF CARRIER LINKS AND A MATERIAL HANDLING SYSTEM COMPRISING A PLURALITY OF CONVEYOR CHAINS

(75) Inventor: Dan Davidson, Gånghester (SE)

(73) Assignee: Eton Innovation AB (SE)

( * ) Notice: Subject to any disclaimer, the term of this patent is extended or adjusted under 35 U.S.C. 154(b) by 9 days.

(21) Appl. No.: 13/700,965

(22) PCT Filed: May 30, 2011

(86) PCT No.: PCT/SE2011/050672
§ 371 (c)(1),
(2), (4) Date: Nov. 29, 2012

(87) PCT Pub. No.: WO2011/152785
PCT Pub. Date: Dec. 8, 2011

(65) Prior Publication Data
US 2013/0081926 A1 Apr. 4, 2013

(30) Foreign Application Priority Data

Jun. 2, 2010 (SE) ..................................... 1050558

(51) Int. Cl.
*B65G 17/42* (2006.01)
*H04W 72/04* (2009.01)
(Continued)

(52) U.S. Cl.
CPC ......... *H04W 72/0406* (2013.01); *B65G 17/323* (2013.01); *B65G 17/40* (2013.01); *B65G 17/005* (2013.01)

(58) Field of Classification Search
CPC .... B65G 17/326; B65G 17/32; B65G 17/005; B65G 17/42
USPC .............................................. 198/682, 470.1
See application file for complete search history.

(56) References Cited

U.S. PATENT DOCUMENTS 3,703,954 A 11/1972 Gudmestad
3,754,637 A * 8/1973 Carter et al. ............... 198/470.1
(Continued)

FOREIGN PATENT DOCUMENTS

CN 2743299 Y 11/2005
FR 2391127 A1 12/1978
(Continued)

OTHER PUBLICATIONS

"International Application Serial No. PCT/SE2011/050672, International Preliminary Report on Patentability mailed May 10, 2012", 11 pgs.
(Continued)

*Primary Examiner* — Gene Crawford
*Assistant Examiner* — Thomas Randazzo
(74) *Attorney, Agent, or Firm* — Schwegman Lundberg & Woessner, P.A.

(57) ABSTRACT

The invention relates to a carrier link of a conveyor chain intended to convey hanging product carriers, which comprises two parallel walls connected by a partition wall and an opening in which a chain lock is positioned, where the chain lock can assume an open state and a closed state, and where the chain lock comprises two locking arms, each with a locking lug, where the locking lugs are intended to secure an object in the central opening such that the product carrier bears against the two locking lugs when the product carrier is conveyed hanging from the carrier link. The invention further relates to a conveyor chain comprising a plurality of carrier links. The aim of the invention is to obtain a more secure carrier link which permits a controlled and traceable flow and which additionally has a higher loading capacity.

11 Claims, 7 Drawing Sheets

(51) Int. Cl.
*B65G 17/32* (2006.01)
*B65G 17/40* (2006.01)
*B65G 17/00* (2006.01)

(56) References Cited

U.S. PATENT DOCUMENTS

| | | | | |
|---|---|---|---|---|
| 4,149,623 | A | * | 4/1979 | Nelson ........................ 198/470.1 |
| 4,817,778 | A | * | 4/1989 | Davidson .................... 198/346.1 |
| 5,697,490 | A | * | 12/1997 | Raque ......................... 198/803.9 |
| 5,893,700 | A | * | 4/1999 | Kronseder ................. 414/744.2 |
| 6,428,454 | B1 | | 8/2002 | Yokota et al. |
| 6,533,126 | B1 | * | 3/2003 | Parsons ........................... 209/617 |
| 7,264,113 | B2 | * | 9/2007 | Hartness et al. .............. 198/850 |
| 2005/0269188 | A1 | * | 12/2005 | Hartness et al. .............. 198/697 |
| 2005/0284731 | A1 | * | 12/2005 | Hartness et al. ............ 198/465.4 |

FOREIGN PATENT DOCUMENTS

| | | | |
|---|---|---|---|
| FR | 2526710 A1 | 11/1983 | |
| SU | 939345 A1 | 6/1982 | |
| WO | WO-87/00821 A1 | 2/1987 | |
| WO | WO-99/44922 A1 | 9/1999 | |
| WO | WO 2006/124344 | * 11/2006 | ............. B65G 17/42 |
| WO | WO-2006/124344 A1 | 11/2006 | |

OTHER PUBLICATIONS

"International Application Serial No. PCT/SE2011/050672, International Search Report mailed Sep. 27, 2011", 6 pgs.

"International Application Serial No. PCT/SE2011/050672, Written Opinion mailed Sep. 27, 2011", 8 pgs.

* cited by examiner

CARRIER LINK, CONVEYOR CHAIN COMPRISING A PLURALITY OF CARRIER LINKS AND A MATERIAL HANDLING SYSTEM COMPRISING A PLURALITY OF CONVEYOR CHAINS

RELATED APPLICATIONS

This application is a nationalization under 35 U.S.C. §371 from International Application Serial No. PCT/SE2011/050672, filed May 30, 2011 and published as WO 2011/152785 A1 on Dec. 8, 2011, which claims the priority benefit of Sweden Application Serial No. 1050558-4, filed Jun. 2, 2010, the contents of which application and publication are incorporated herein by reference in their entirety.

TECHNICAL FIELD

The present invention relates to a carrier link for a conveyor chain.

BACKGROUND ART

There are many different material handling systems consisting of conveyor systems and conveyor installations including more or less intelligent control for handling and transporting goods, e.g. workpieces, between different work posts in the manufacture of goods that require several work steps. In one type of material handling system, the conveyor system consists of a main conveyor, which in turn can consist of a plurality of conveyor belts, and a plurality of side conveyors. A side conveyor selectively leads workpieces from the main conveyor to work posts where one or more work steps are performed on the workpiece, after which the workpiece is returned to the main conveyor with the aid of the side conveyor.

A particular type of material handling system comprises a conveyor system in which the actual conveyor belt is placed above the work posts. The workpieces are here secured on hanging product carriers, which are moved on the main conveyor, which can be an endless conveyor belt for example. The side conveyors in this case consist of work stations which are adapted to selectively move a product carrier from the conveyor belt, which is located at an upper level, down to a work post, which is located at a lower level, with the aid of a conveyor chain. When the work step has been carried out, the product carrier is driven with the workpiece up to the conveyor belt again for continued transport of the product carrier to the next work station. Each product carrier comprises a holder in which one or more workpieces are secured. The holder is adapted to the product that is being manufactured and can hold one or more workpieces. These can be, for example, parts of a shirt, in which case the holder holds all the parts of a shirt at the start of the transport flow and in which the holder only holds the finished shirt when the product carrier reaches the end of the transport flow. Each product carrier can also comprise some form of identification means, such that the product carrier can be identified by the system, which means that each product carrier can be conveyed to predetermined work stations and onward to predetermined work posts. Such material handling systems are known to a person skilled in the art and are common particularly in the clothing industry.

The conveyor chain that conveys the product carriers from the work stations to the work posts consists of a number of articulated links, which can be carrier links and intermediate links. A carrier link can also be referred to as an inner link, and an intermediate link can also be referred to as an outer link. Each conveyor chain is driven by one or more separately controlled chain wheels. The carrier links are adapted to be able to couple to and secure a product carrier for transporting workpieces to the work post and for transporting the product carrier back to the conveyor belt after the work step has been carried out. The product carrier is preferably stopped at the work post when the work step is being carried out, without the product carrier having to be detached from the conveyor chain. If necessary, a product carrier can be released from the conveyor chain, for example for maintenance.

For the product carrier to be coupled to and uncoupled from the conveyor chain, a carrier link is designed with a retaining device in the form of a chain lock which can be opened for receiving a product carrier and closed in order to retain the product carrier. The chain lock can be opened in different ways, for example by a lever arm or by a specially adapted chain wheel.

A known carrier link, described in U.S. Pat. No. 4,817,778 A1, is provided with a spring-loaded chain lock, which is opened each time it passes an opening chain wheel, and which closes, via the spring, when it leaves the opening chain wheel. The length of the teeth of the opening chain wheel is adapted so that the teeth activate the opening function of the chain wheel, which opens the chain lock. This happens when the carrier link with the chain lock passes the opening chain wheel. The chain wheels that are intended only to advance the conveyor chain have shorter teeth, which do not come into engagement with the opening function of the chain lock. In this way, the product carrier can be easily hooked onto and unhooked from the conveyor chain at special docking and unloading stations.

In the described carrier link, the spring-loaded chain lock has a single locking tooth, i.e. it locks the product carrier only on one side. In the event of damage or wear of the chain lock or the locking tooth, this can mean that the retaining function of the chain lock does not function satisfactorily. This can in turn mean that a product carrier comes loose from the carrier link.

The single locking tooth can also be released manually in a relatively simple way, which is not always desirable. In some manufacturing, for example where traceability is desired, a product carrier should only be released by special personnel, for example for maintenance, for repair or for modifications to the work flow. In these cases, it is desirable to make the release of a product carrier relatively difficult, for example by means of a special tool key having to be used.

The described carrier link is designed for relatively light workpieces, for example shirts. In order to increase the range of use, it is desirable that the carrier link is also designed to be able to transport heavier workpieces.

The described conveyor chain functions satisfactorily in some applications, but there is room for development in order to satisfy future requirements.

DISCLOSURE OF THE INVENTION

The object of the invention is therefore to make available an improved carrier link intended for a conveyor chain, and also a conveyor chain comprising a plurality of such carrier links.

With a carrier link for a conveyor chain intended to convey hanging product carriers, comprising two parallel walls connected by a partition wall, where the walls have a central opening on a long side, where the carrier link comprises a chain lock positioned at the opening, and where the chain lock can assume an open state and a closed state, the object of the invention is achieved by the fact that the chain lock comprises two locking arms, each with a locking lug, where the locking lugs are intended to secure an object in the central opening such that the product carrier bears against the two locking lugs when the product carrier is conveyed hanging from the carrier link.

In this first embodiment of the carrier link according to the invention, the carrier link thus has two locking arms, and this increases safety if either locking arm were to fail. At the same time, the load-bearing capacity of a carrier link can be increased, since the hanging load can be distributed on two locking arms. In addition, there is less risk of unauthorized manual release of a product carrier from the carrier link, since manual release is made difficult by two locking arms, and this permits a traceable work flow.

In an advantageous first development of the carrier link according to the invention, the open state and the closed state of the carrier link are two stable states. The advantage of this is that the chain lock only changes states when so required, which reduces the wear on the chain lock. Known chain locks with spring-loaded closure open and close constantly, which entails unnecessary wear and tear.

In another advantageous development of the carrier link according to the invention, the closed state of the chain lock is obtained by means of two maneuvering arms of the chain lock driving the locking arms into their respective closed positions. The advantage of this is that the chain lock only assumes the closed state when so required, which reduces the wear on the chain lock.

In another advantageous development of the carrier link according to the invention, the closed state of the chain lock is obtained by means of a shaft of the product carrier activating the maneuvering arms. The advantage of this is that the chain lock only assumes the closed state when a product carrier is to be coupled to the carrier link, which avoids unnecessary closure of the chain lock and thereby reduces the wear on the chain lock.

In another advantageous development of the carrier link according to the invention, the open state of the chain lock is obtained by means of the chain wheel teeth of a chain wheel sequentially driving the locking arms into the open state. The advantage of this is that the chain lock only assumes the open state when so required, which reduces the wear on the chain lock.

In another advantageous development of the carrier link according to the invention, the locking arms comprise a retaining pin which cooperates with a first retaining hole in the open state and cooperates with a second retaining hole in the closed state. The advantage of this is that the locking arms can be retained in the two stable states.

In another advantageous development of the carrier link according to the invention, the retaining pin sits on a resilient retaining lug which is unloaded when the chain lock is in its open or closed state. The advantage of this is that the retaining lug is only loaded when it changes state, which reduces the wear on the chain lock.

In another advantageous development of the carrier link according to the invention, the rotation pin of the locking arms cooperates with a rotation hole positioned on the same side of the opening as the respective locking arm. The advantage of this is that a short load path is obtained between the locking lug's bearing surface for the product carrier and the rotation pin, which minimizes stretching of the material. In addition, a line of force from the bearing surface is obtained that largely passes through the rotation pin, and this further optimizes the force uptake of the chain lock.

In an advantageous conveyor chain according to the invention, the conveyor chain comprises a plurality of carrier links according to the invention. The advantage of this is that a conveyor chain is obtained which is more secure, which permits a controlled and traceable work flow, and which has an increased loading capacity compared to known conveyor chains.

BRIEF DESCRIPTION OF THE FIGURES

The invention will be described in more detail below with reference to the embodiments shown in the attached drawings, in which.

DESCRIPTION OF EMBODIMENTS

The embodiments of the invention that are described below, along with developments thereof, are to be understood only as examples and do not in any way limit the scope of protection of the claims.

Figure 7:
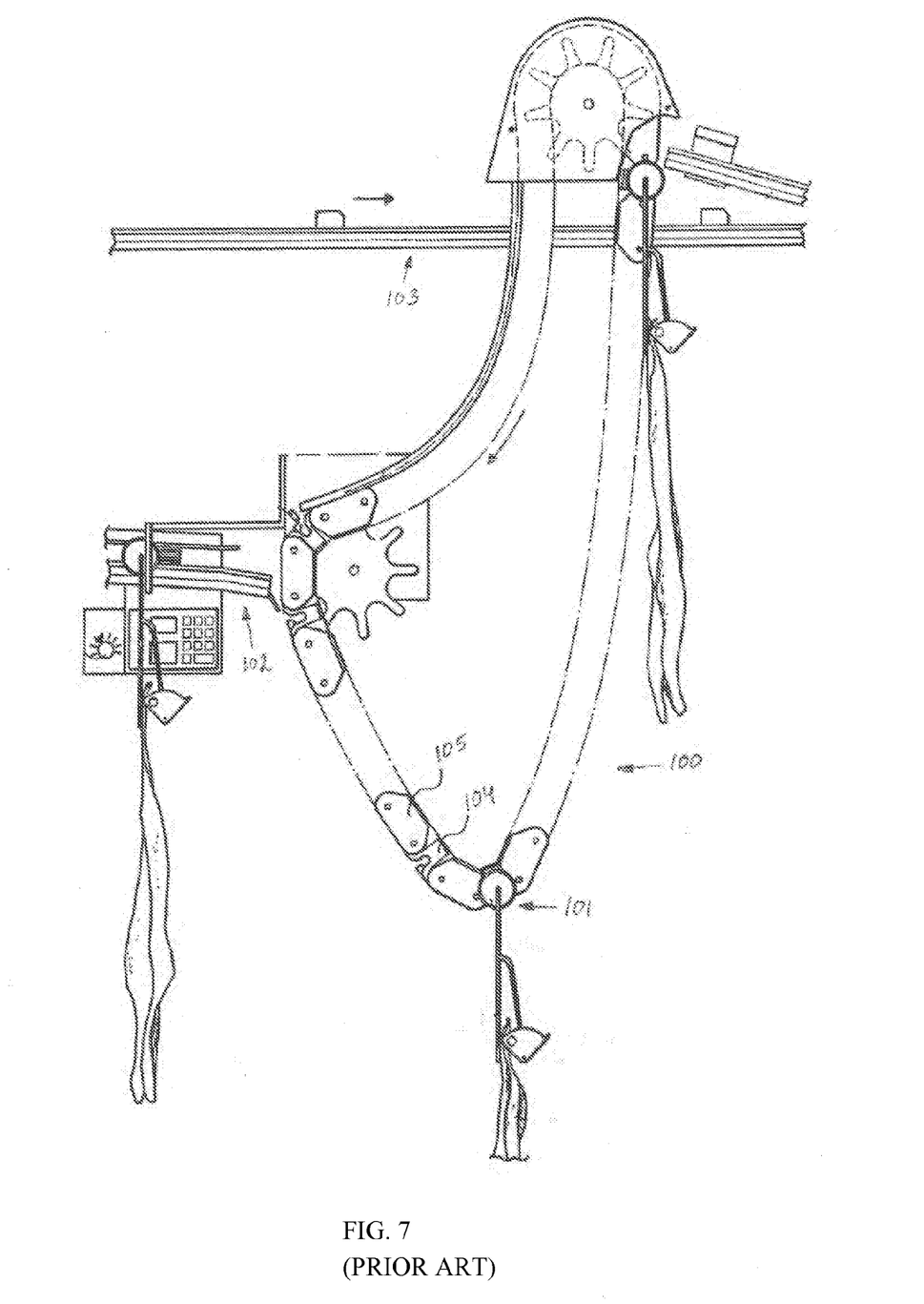
FIG. 7 shows a known conveyor chain.

FIG. 7 shows a known conveyor chain of a conveyor for product carriers. The conveyor chain 100 is intended to transport the product carriers 101 from a product feeder on a first rail 102 down to a work station (not shown) located at the lowest point of the chain. When the operation on the product, e.g. an article of clothing secured by the product carrier, is completed, the conveyor chain drives the product carrier up to a loader on a second chain 103 located at an upper level, which can constitute a main conveyor chain. The conveyor chain consists of carrier links 104 and intermediate links 105. Such a conveyor chain is described in U.S. Pat. No. 4,817,778, which is herewith incorporated by reference.

Figure 1:
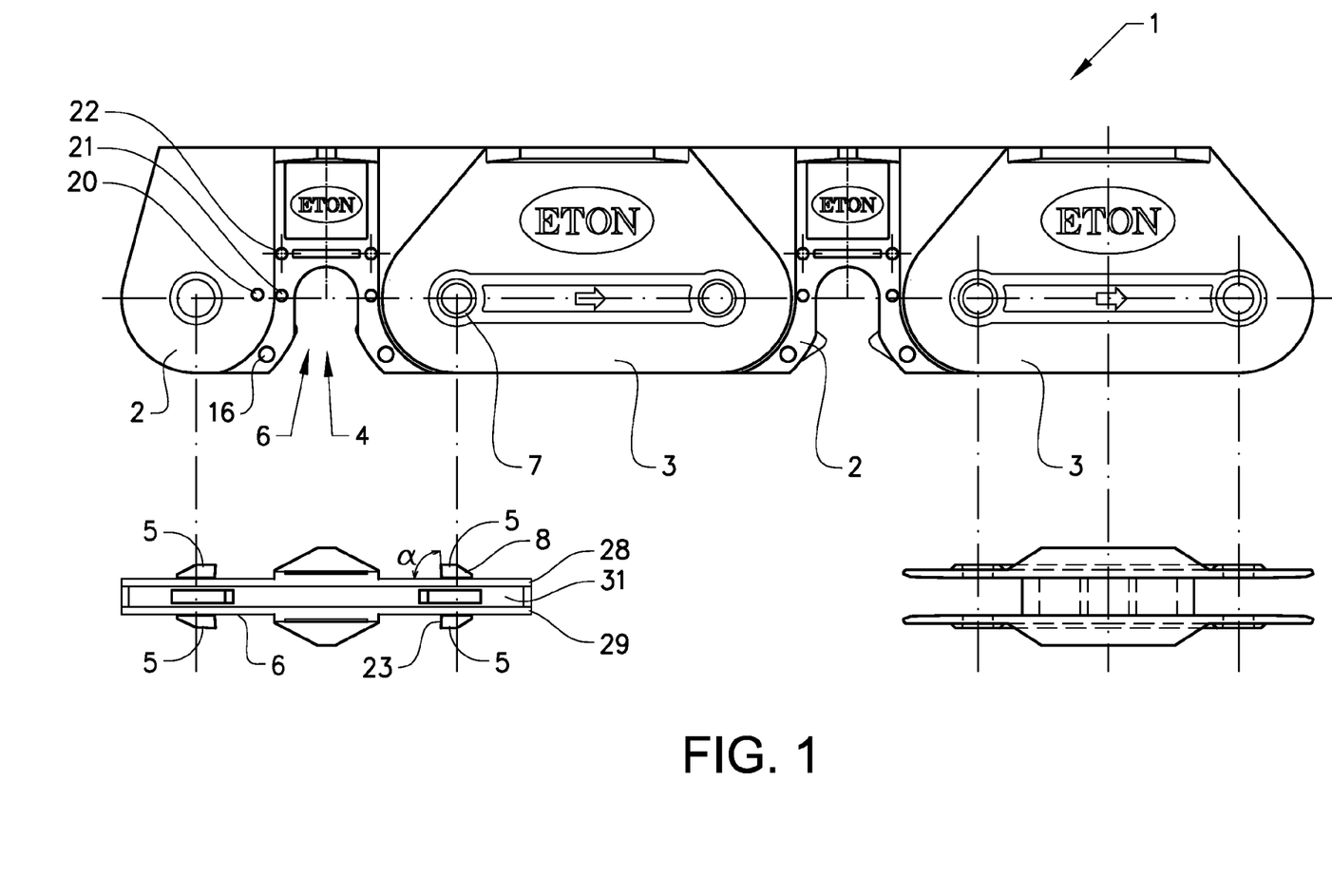
FIG. 1 shows part of a conveyor chain according to the invention.

FIG. 1 shows part of a conveyor chain 1 with carrier links 2 and intermediate links 3. A carrier link comprises two parallel walls, namely a first wall 28 and a second wall 29, which are connected by a partition wall 31, such that a hollow space is formed on each side of the partition wall. A carrier link has a central opening 4 on one of its long sides, and thus the carrier link comprises, at the opening 4, a chain lock 6 enclosed in one hollow space. The conveyor chain 1 is held together by means of the carrier links 2 being provided with two pairs of pins 5, each pair consisting of one pin on each outer side of the carrier link in a coaxial position in relation to one another, and with one pair symmetrically arranged on each side of the opening 4. The intermediate links are provided with corresponding holes 7 in their walls, such that the pins 5 of the carrier links are mounted in the holes 7 of the intermediate links. To make assembly of the conveyor chain easier, the pins 5 can thus advantageously be provided with a bevel 8 which makes it easier to join the chain together. Since the walls of the intermediate link are slightly resilient, this means that carrier links and intermediate links can be assembled in a simple way, which is advantageous for servicing and reconfiguration of a conveyor chain.

Figure 2:
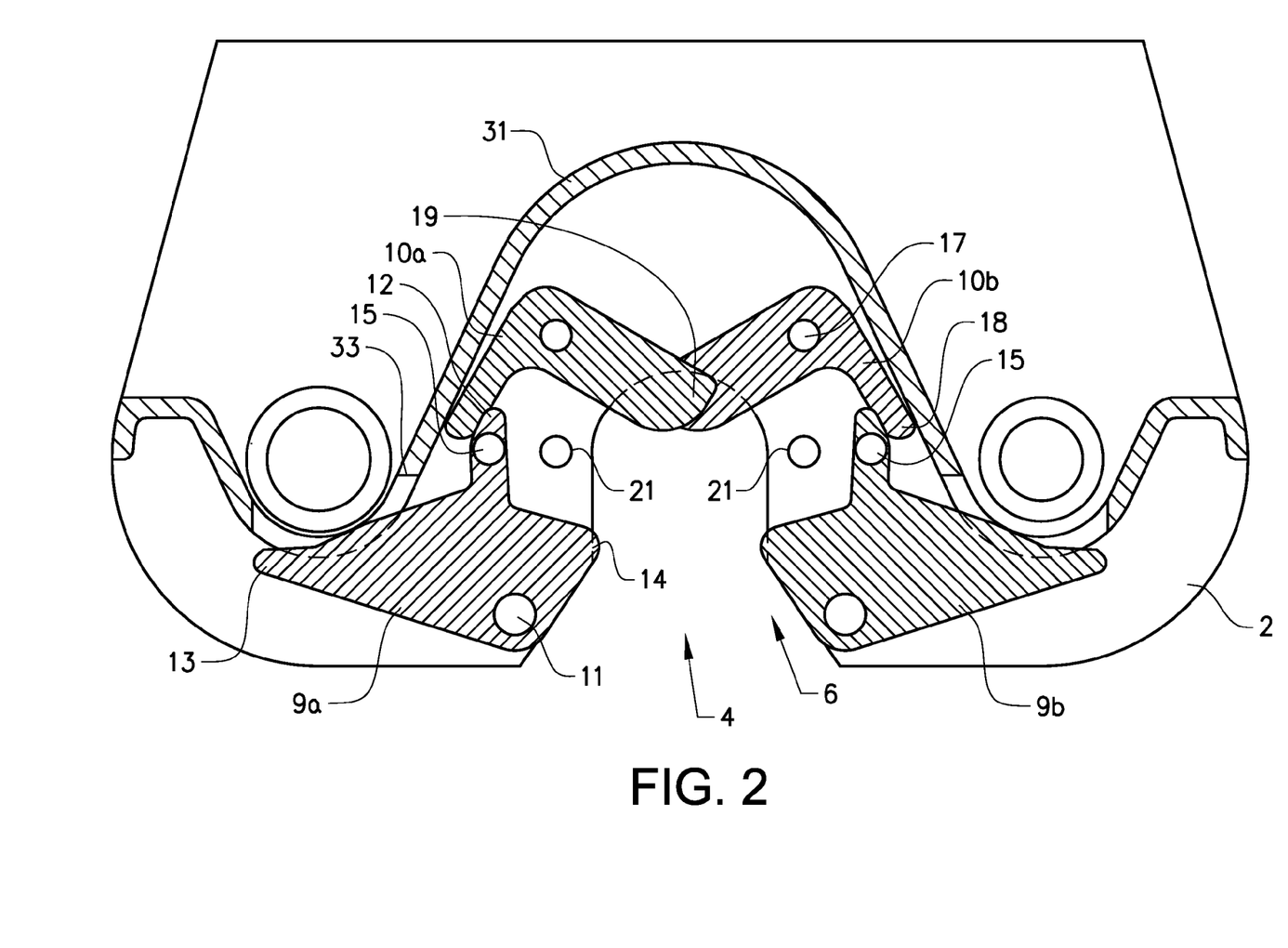
FIG. 2 shows a carrier link according to the invention with open chain lock.
Figure 3:
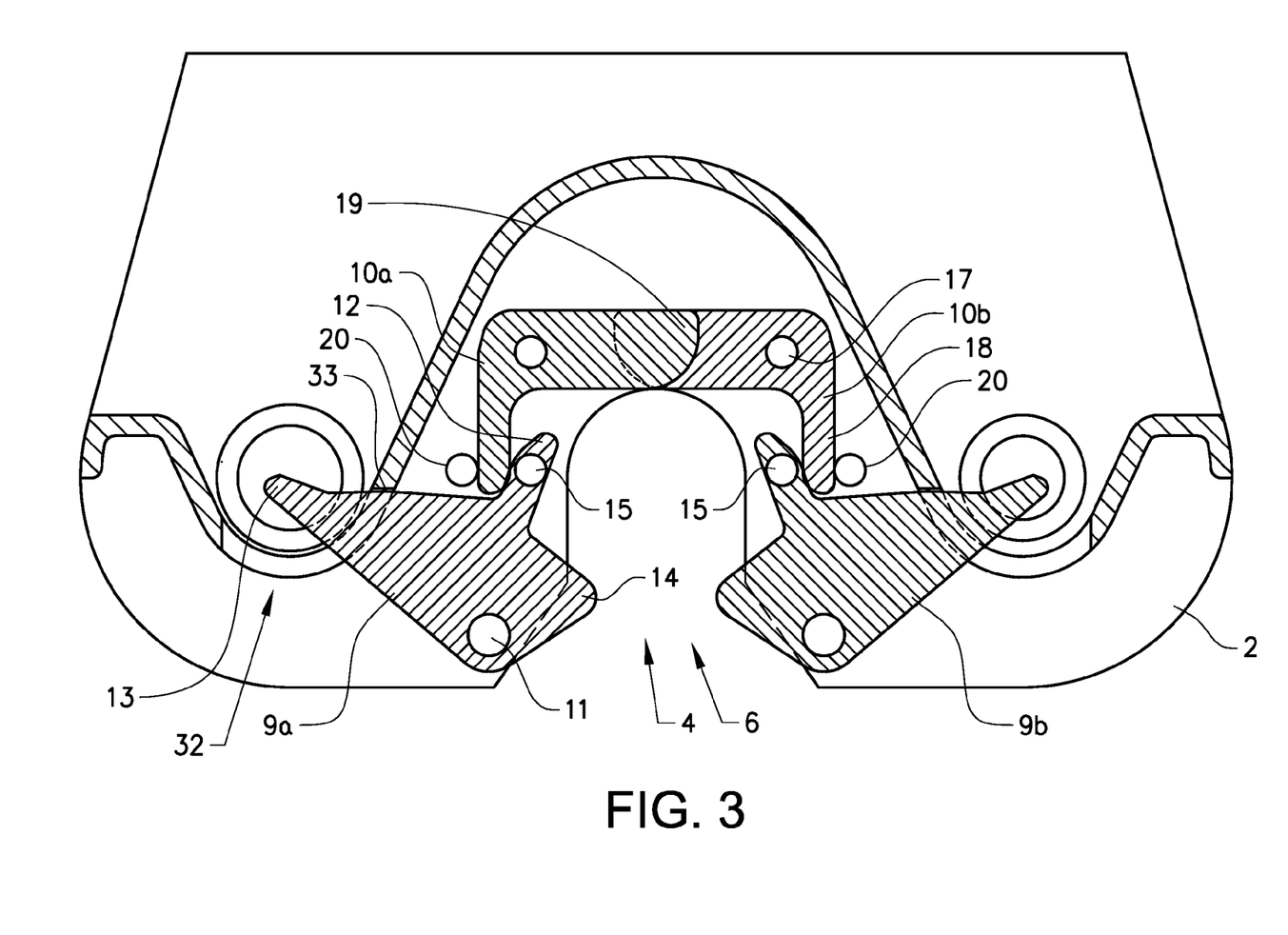
FIG. 3 shows a carrier link according to the invention with closed chain lock.

FIG. 2 shows a carrier link 2 according to the invention, in which the chain lock 6 is in an open state. FIG. 3 shows the same carrier link with the chain lock 6 in a closed state. The carrier link 2 has a central opening 4 placed in the lower part of the carrier link. The opening is adapted in size in order to cooperate with an object in the form of a shaft element of a product holder. A chain lock 6, which can be opened and closed, sits at the opening. The chain lock 6 consists of two lock halves, which are placed symmetrically on each side of the opening. Each lock half consists of a locking arm 9a, 9b and a maneuvering arm 10a, 10b. The locking arms 9a, 9b are identical here, which makes production simpler and less expensive, but they could also be of different designs. The same applies to the maneuvering arms 10a, 10b, which are also identical. Since each lock half comprises the same parts and has the same function, only one lock half will be described in detail, namely the left-hand one in the views in FIGS. 2 and 3.

The chain lock 6 is placed in the carrier link 2. The carrier link consists of two parallel walls with a hollow space between them. The walls are connected to each other by a partition wall 31, which is intended to cooperate with a chain wheel. The partition wall 31 therefore has a shape that matches the teeth of the chain wheel. The chain lock is mounted in that part of the hollow space closest to the opening 4.

The lock half consists of locking arm 9a and maneuvering arm 10a. The locking arm 9a comprises a rotation pin 11 around which the locking arm rotates when the chain lock is maneuvered between the open state and the closed state. The locking arm also comprises a retaining lug 12, a first maneuvering lug 13, a locking lug 14 and a positioning means in the form of a retaining pin 15. There are a rotation pin 11 and a retaining pin 15 on both sides of the locking arm such that they can cooperate with holes in both walls of the carrier link. These rotation pins have a common central axis. The retaining pins 15 also have a common central axis. The retaining lug 12 is intended to cooperate with the maneuvering arm 10 when the chain lock is to be closed. The first maneuvering lug 13 is intended to cooperate with a tooth on the chain wheel when the chain lock is to be opened. The locking lug 14 is intended to secure the product carrier when the chain lock is closed.

The maneuvering arm 10a comprises a rotation pin 17 around which the maneuvering arm rotates when the chain lock is maneuvered between the open state and the closed state. The maneuvering arm further comprises a second maneuvering lug 18 and a third maneuvering lug 19. There is a rotation pin 17 on both sides of the maneuvering arm, such that they can cooperate with holes in the walls of both carrier link. The second maneuvering lug 18 is intended to cooperate with the locking arm when the chain lock is to be closed. The third maneuvering lug 19 is intended to be maneuvered by the product carrier when the chain lock is to be closed.

The carrier link further comprises rotation holes 16 in which the locking arms 9a, 9b are mounted, and rotation holes 22 in which the manoeuvring arms 10a, 10b are mounted. Each half of the carrier link has two rotation holes 16, such that they can cooperate with the rotation pins 11 on the locking arm and two rotation holes 22 such that they can cooperate with the rotation pins 17 on the manoeuvring arm. Each half of the carrier link also has a pair of first securing means in the form of retaining holes 20 and a pair of second securing means in the form of retaining holes 21. The first retaining hole 20 is intended to cooperate with the retaining pins 15 of the locking arm when the chain lock is in its open state, and the second retaining hole 21 is intended to cooperate with the retaining pin 15 of the locking arm when the chain lock is in its closed state. By virtue of the locking arms either assuming the open state or the closed state, the locking arms thus assume one of two fixed states, in which the locking arms can rest in an unloaded state. In this way, there is nothing trying to force the locking arms from one state to the other.

When the chain lock is maneuvered between the open state and the closed state, the rotation pins 11 rotate in the rotation holes 16 and the rotation pins 17 in the rotation holes 22.

Figure 4A:
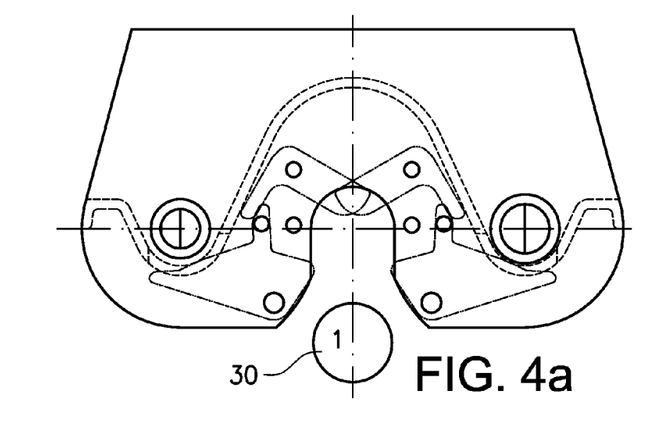
FIGS. 4a-4d show the insertion of a product carrier into an opened carrier link, with simultaneous closure of the chain lock.
Figure 4B:
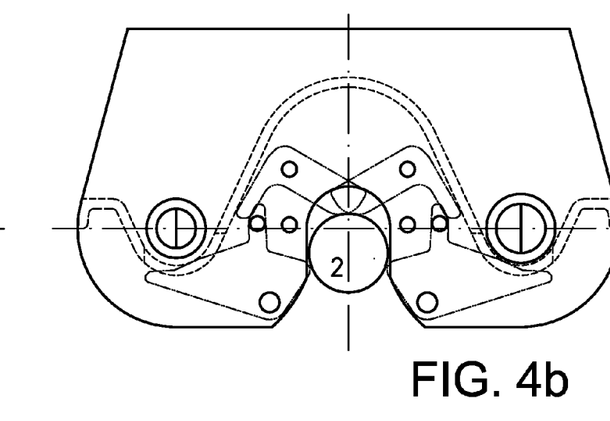

FIGS. 4a-4d show the function of the chain lock when a product carrier is introduced into the carrier link and is securely locked when the chain lock is closed. A product carrier comprises two wheels connected by a shaft and is represented here by shaft 30. The product carrier runs on a rail, for example, and is thus controlled laterally and vertically relative to the chain lock before it is coupled to a conveyor chain. In FIG. 4a, the chain lock is thus open and the product carrier is driven toward the opening of the carrier link, e.g. by means of the product carrier rolling on a conveyor chain. In FIG. 4b, the product carrier has been introduced into the opening, such that it bears exactly against the maneuvering arms 10a, 10b.

Figure 4C:
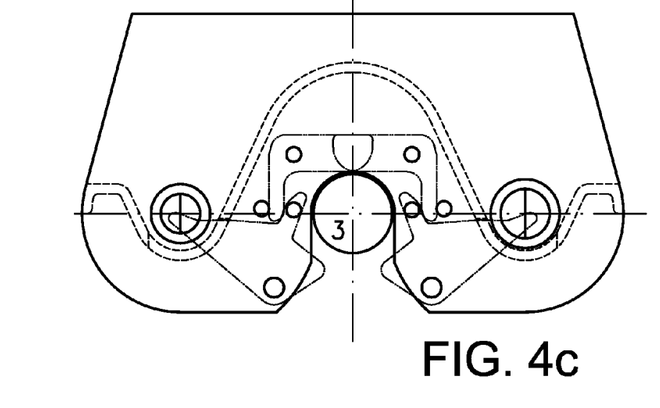
Figure 4D:
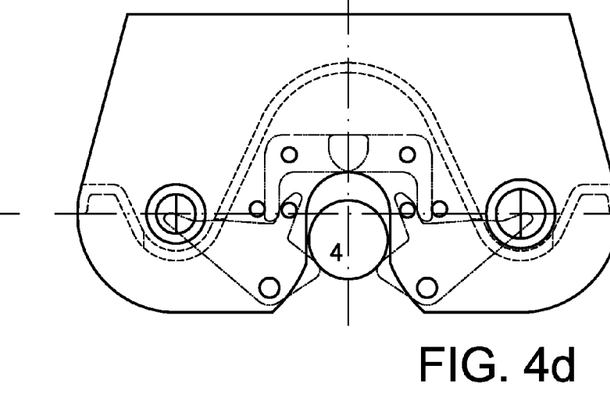

When the product carrier is driven farther into the opening, the product carrier drives the maneuvering arms inward into the opening, against the inner edge of the opening. The shaft of the product carrier thus acts on the maneuvering lug 19 of the maneuvering arm. The maneuvering arm is then turned around the rotation pin 17, and the maneuvering lug 18 is turned toward the opening 4. Since the maneuvering lug 18 bears against the retaining lug 12 on the locking arm 9, the locking arm 9 is thus turned around the rotation pin 11, which allows the locking lug 14 to move into the opening 4. When the shaft 30 of the product carrier is inserted fully into the opening, as is shown in FIG. 4c, both locking lugs 14 are in their outermost positions, i.e. as far into the opening as possible, and the chain lock is thus closed. As is shown in FIG. 4d, the product carrier is thus prevented from leaving the carrier link and instead bears on the locking lugs 14. As can also be seen, the locking lugs are unloaded when the opening 4 is closed.

When the chain lock is open according to FIG. 4a, the locking arm 9a is held in the open position by means of the retaining pin 15 lying in the retaining hole 20. This means that the chain lock is kept open even when the conveyor chain is exposed to external loads, for example vibrations. In the same way, the locking arm 9a is kept in the closed position by means of the retaining pin 15 lying in the retaining hole 21 when the chain lock is closed. The retaining lug 12 is thus advantageously slightly resilient, such that the retaining pins 15 can be moved between the retaining holes 20 and 21. This can be achieved, for example, by means of the retaining lug 12 being composed of two arms which are slightly resilient, with each arm supporting a retaining pin.

At the same time as the locking arm is turned toward the opening 4, the maneuvering lug 13 is driven in through the opening 32 in the partition wall 31, which joins together the two outer sides of the carrier link. The partition wall 31 has a stop edge 33 against which the maneuvering lug 13 rests when the chain lock is closed. The locking arm is thus prevented from being turned farther in toward the opening 4 when the locking lug 14 is loaded by the product carrier. The force that the product carrier exerts on the locking lug 14 is transferred mainly to rotation pin 11. Since the distance between the bearing surface of the locking lug 14 and rotation pin 11 is relatively short, and since the force from the product carrier on the locking lug 14 is directed substantially toward the rotation pin 11, unfavorable torques on locking lug 14 are prevented. By dimensioning the locking arms 9a, 9b and the rotation pins 11, a desired load-bearing capacity is obtained for the chain lock and therefore for the carrier link.

Figures 5A, 5C:
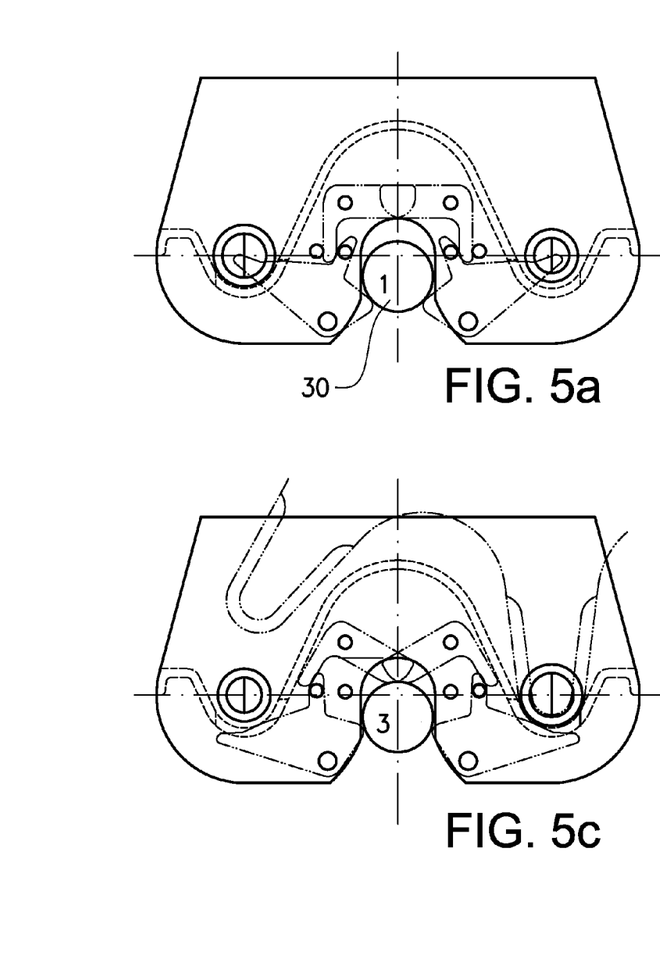
FIGS. 5a-5d show the opening of a chain lock with simultaneous release of a product carrier.
Figure 5B:
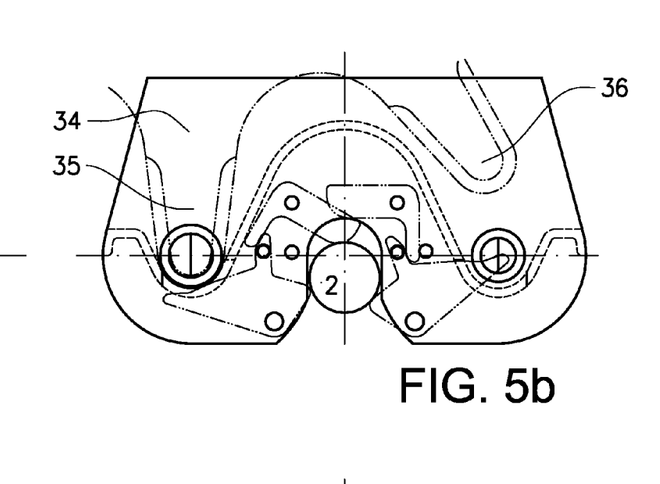

FIGS. 5a-5d show the function of the chain lock when a product carrier is released from the carrier link when the chain lock is opened. In this case, which is also the normal conveying state of the product carrier in a conveyor chain, the product carrier hangs from the carrier link, i.e. the product carrier rests on the locking lugs 14. In FIG. 5a, which corresponds to FIG. 4d, the chain lock is in a closed state. In FIG. 5b, the carrier link runs toward an opening chain wheel 34, which has a number of chain wheel teeth, of which a first chain wheel tooth 35 and a second chain wheel tooth 36 are shown. The chain wheel 34 is formed such that its shape substantially corresponds to the partition wall 31 of the carrier link, which means that the opening chain wheel can also drive the conveyor chain. The first chain wheel tooth 35 is shown here in position in the opening 32, which means that the chain wheel tooth 35 presses the maneuvering lug 13 in through the opening 32. The locking arm 9a is then turned around the rotation pin 11, which allows the locking lug 14 to move out of the opening 4. One half of the chain lock is thus open. The locking arms are designed such that a product carrier is held in place with only one locking arm in the locked position.

Figure 5D:
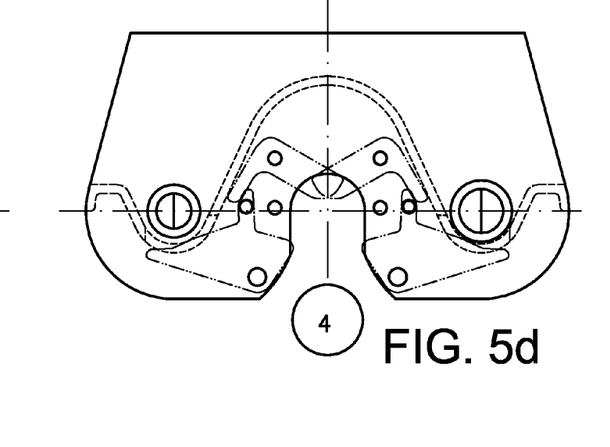

In FIG. 5c, the second chain wheel tooth 36 has pressed the maneuvering lug of the locking arm 9b through the opening in the partition wall 31, in the same way as has been described above. Both the locking arms 9a, 9b are thus opened, which means that the chain lock is open and that the product carrier can thus be released from the carrier link, which is shown in FIG. 5d. It is also possible to let the product carrier rest against an outer support when the product carrier is released from the carrier link, such that the locking lugs are unloaded during the release. This is particularly advantageous when the product carrier holds heavy products.

Figure 6A:
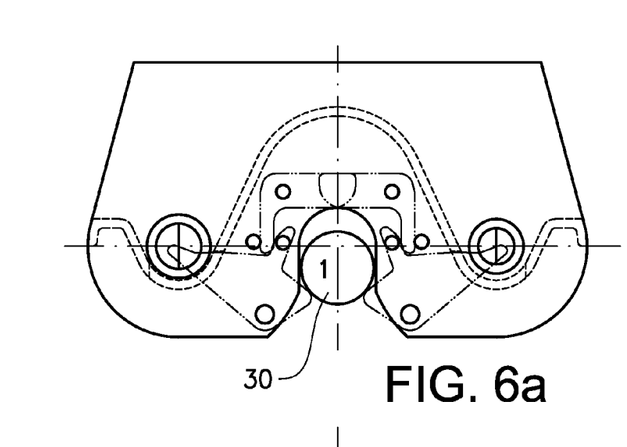
FIGS. 6a-6d show an alternative way of opening the chain lock with simultaneous release of a product carrier.
Figure 6B:
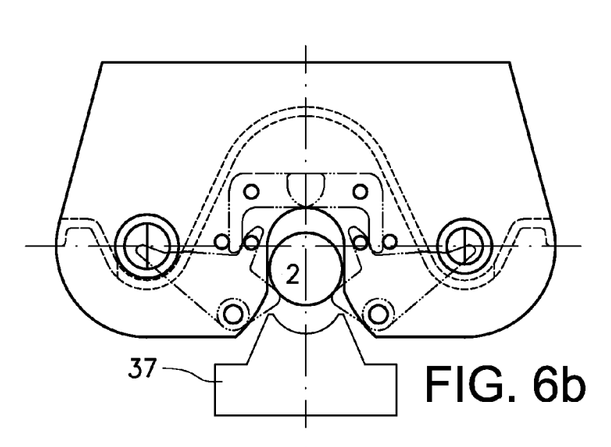
Figure 6C:
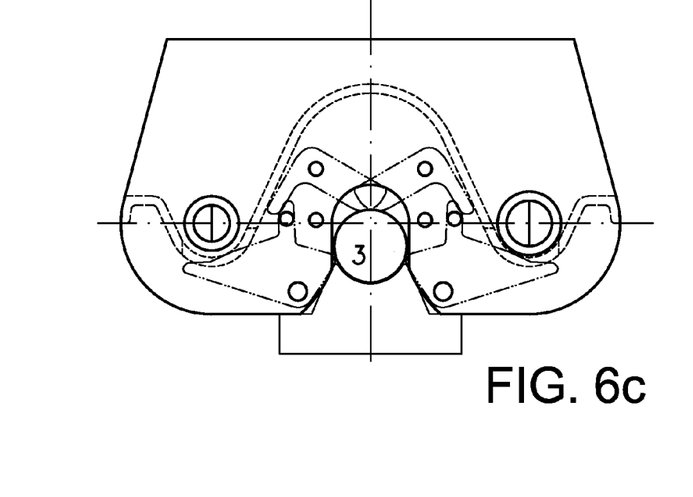
Figure 6D:
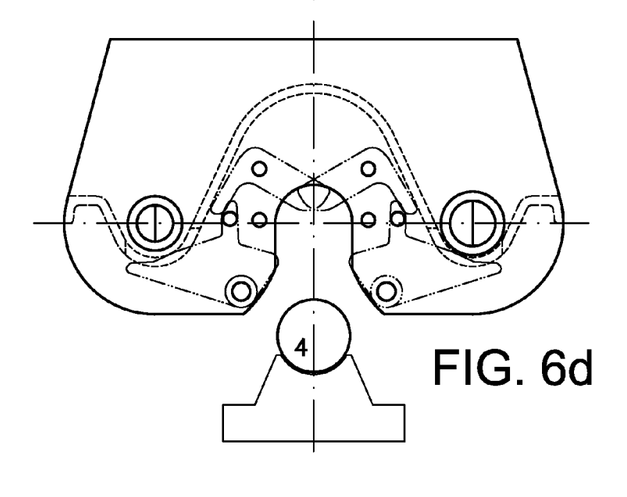

FIGS. 6a-6d show an alternative way of releasing a product carrier from the carrier link by means of the chain lock being opened. In this case, both the locking arms are opened simultaneously. In FIG. 6a, which corresponds to FIG. 4d, the chain lock is in a closed state. In FIG. 5b, an opening tool 37 in the form of a tool key is driven toward the lower sides of the locking lugs 14. The opening tool can either be integrated in the transport system or free-standing. In this embodiment, the opening tool is a manually operated tool, which is used when a product carrier is to be released from the conveyor chain in a non-standard way, for example for maintenance or in the event of a malfunction. When the tool contacts the locking lugs and is driven farther toward the chain lock, the tool moves the locking lugs out of the opening 4 such that the chain lock is opened, which is shown in FIG. 6c, and the product carrier is released. In FIG. 6d, the tool is moved back from the chain lock, and the product carrier, which here rests on the tool, follows it.

Because a special tool is needed, for example an opening tool 37, this ensures that a product carrier is not released from the conveyor chain in an unauthorized manner. This means that full traceability of the produced goods is possible since the product carrier, and with it the products, can only be released from the conveyor chain in a controlled way. The opening tool 37 can be designed in a number of ways. In the example shown, the opening tool is designed as a key intended to release a product carrier from the carrier link in a simple and rapid manner. The release in this case takes place from the outside of the carrier link by mans of both the locking lugs being released simultaneously. An opening tool can also be designed such that it releases one locking lug at a time from the outside of the carrier link, or such that the locking lugs are released by means of the key releasing the locking lugs in the same way as the teeth of the chain wheel.

An advantage of the carrier link according to the invention is that the chain lock is provided with two locking lugs. This means, on the one hand, that the chain lock functions even if one half of the chain lock were to fail for any reason, which increases the safety of the material handling system. On the other hand, the two locking lugs have the effect that each carrier link can carry a greater load, which means that the material handling system can be used for larger and heavier products.

Another advantage is that the locking lugs are positively controlled. This means that when one locking lug is in a locked position, for example, it remains there until it is to be opened. Known locking devices, with a spring-loaded locking lug, are opened each time they pass an opening chain wheel, which increases the wear and tear on the system.

In addition, the spring in a conventional locking device contributes to the holding force of the locking device, i.e. the load-bearing capacity is dependent on the spring force of the spring. If the spring ages or breaks, this affects the load-bearing capacity.

Since the locking lug in the carrier link according to the invention is not spring-loaded, the load-bearing capacity will be the same throughout the lifetime of the system. With the locking lugs used, a short loading path on the locking lug is also achieved, which further increases the strength.

In order to increase the total carrying capacity of a conveyor belt, each pin 5 can be given a slightly negative inclination on its contact surface 23, i.e. the angle α between the contact surface and the surface of the carrier link is greater than 90°. This means that when the conveyor chain is loaded, the sides of the intermediate link are not bent outward and do not slip off the pins on a carrier link since the material in the carrier link and the intermediate link stretches slightly. It is also possible to have a corresponding inclination on the pin holes in the intermediate link.

The invention is not limited to the embodiments described above, and instead a number of other variants and modifications are conceivable within the scope of the attached claims.

REFERENCE SIGNS 1 conveyor chain
2 carrier link
3 intermediate link
4 opening
5 pin
6 chain lock
7 hole
8 bevel
9a, b locking arm
10a, b maneuvering arm
11 rotation pin
12 retaining lug
13 first maneuvering lug
14 locking lug
15 retaining pin
16 rotation hole
17 rotation pin
18 second maneuvering lug
19 third maneuvering lug
20 first retaining hole
21 second retaining hole
22 rotation hole
23 bearing surface
28 first wall 29 second wall
30 product carrier
31 partition wall
32 opening
33 stop edge
34 chain wheel
35 first chain wheel tooth
36 second chain wheel tooth
37 opening tool
α angle for bearing surface 23
100 conveyor chain
101 product carrier
102 first rail
103 second rail
104 carrier link
105 intermediate link

The invention claimed is:

1. A carrier link of a conveyor chain intended to convey hanging product carriers comprising:
   two parallel walls connected by a partition wall, where the two parallel walls have a central opening, the central opening adapted to cooperate with a product carrier;
   a chain lock at least partially enclosed within a hollow space formed between the two parallel walls and positioned at the central opening, where the chain lock can assume an open state and a closed state,
   wherein the chain lock comprises two locking arms, each with a locking lug, wherein when in the closed state the locking lugs are adapted to secure the product carrier in the central opening such that the product carrier bears against the two locking lugs when the product carrier is conveyed hanging from the carrier link, and
   wherein the chain lock is substantially enclosed within the hollow space formed between the two parallel walls when the chain link is in the open state, and
   wherein the open state and the closed state are two fixed states in which the locking arms rest in an unloaded state without an spring mechanism to force the locking arms to change from one state to the other.

2. The carrier link as claimed in claim 1, wherein the open state and the closed state are two stable states which are assumed in that each locking arm comprises a retaining pin which cooperates with a first retaining hole in the open state and with a second retaining hole in the closed state.

3. The carrier link as claimed in claim 1, wherein the closed state of the chain lock is obtained by means of two manoeuvring arms of the chain lock driving the locking arms into their respective closed positions.

4. The carrier link as claimed in claim 3, wherein the closed state of the chain lock is obtained by means of a shaft of the product carrier activating the manoeuvring arms.

5. The carrier link as claimed in claim 1, wherein the open state of the chain lock is obtained by means of a number of chain wheel teeth of a chain wheel sequentially driving the locking arms into the open state, such that one locking arm opens before the other locking arm.

6. The carrier link as claimed in claim 1, wherein the open state of the chain lock is obtained by means of an opening tool simultaneously driving the locking arms into the open state.

7. The carrier link as claimed in claim 2, wherein the retaining pin sits on a resilient retaining lug which is unloaded when the chain lock is in its open or closed state.

8. The carrier link as claimed in, claim 1, wherein a rotation pin of the locking arms cooperates with a rotation hole positioned on the same side of the opening as respective locking arm.

9. The carrier link as claimed in claim 2, wherein the locking arms are made of a plastic material.

10. A conveyor chain, comprising:
    a plurality of carrier links, at least one of the carrier links including
    two parallel walls connected by a partition wall, where the two parallel walls have a central opening, the central opening adapted to cooperate with a product carrier;
    a chain lock at least partially enclosed within a hollow space formed between the two parallel walls and positioned at the opening, where the chain lock can assume an open state and a closed state,
    wherein the chain lock comprises two locking arms, each with a locking lug, wherein when in the closed state the locking lugs are adapted to secure the product carrier in the central opening such that the product carrier bears against the two locking lugs when the product carrier is conveyed hanging from the carrier link, and
    wherein the chain lock is substantially enclosed within the hollow space formed between the two parallel walls when the chain link is in the open state, and
    wherein the open state and the closed state are two fixed states in which the locking arms rest in an unloaded state without an spring mechanism to force the locking arms to change from one state to the other.

11. A material handling system comprising:
    a plurality of conveyor chains, at least one of the conveyor chains including a plurality of carrier links, wherein at least one of the conveyor links includes:
    two parallel walls connected by a partition wall, where the two parallel walls have a central opening, the central opening adapted to cooperate with a product carrier;
    a chain lock at least partially enclosed within a hollow space formed between the two parallel walls and positioned at the central opening, where the chain lock can assume an open state and a closed state,
    wherein the chain lock comprises two locking arms, each with a locking lug, wherein when in the closed state the locking lugs are adapted to secure the product carrier in the central opening such that the product carrier bears against the two locking lugs when the product carrier is conveyed hanging from the carrier link, and
    wherein the chain lock is substantially enclosed within the hollow space formed between the two parallel walls when the chain link is in the open state, and
    wherein the open state and the closed state are two fixed states in which the locking arms rest in an unloaded state without an spring mechanism to force the locking arms to change from one state to the other.

* * * * *